UNITED STATES PATENT OFFICE.

JOHN JAMES HOOD AND ALFRED GORDON SALAMON, OF LONDON, ENGLAND.

MANUFACTURE OF CYANOGEN COMPOUNDS.

SPECIFICATION forming part of Letters Patent No. 570,480, dated November 3, 1896.

Application filed February 17, 1896. Serial No. 579,625. (No specimens.) Patented in England March 25, 1891, No. 5,354, and in Germany February 28, 1892, No. 72,644.

*To all whom it may concern:*

Be it known that we, JOHN JAMES HOOD, residing at 21 Shepherd's Bush Road, London, in the county of Middlesex, and ALFRED GORDON SALAMON, residing at 1 Fenchurch avenue, in the city of London, England, analytical chemists, subjects of the Queen of Great Britain, have invented certain new and useful Improvements in the Manufacture of Cyanogen Compounds and the Treatment of Substances used Therein, (for which we have received Letters Patent in Great Britain, No. 5,354, dated March 25, 1891; in Germany, No. 72,644, dated February 28, 1892, and patent of addition thereto No. 81,116, dated April 17, 1894,) of which the following is a specification.

In the well-known Gèlis process, which consists in generating sulfocyanic acid by heating in a closed vessel under pressure a mixture of ammonia and carbon bisulfid only about thirty-three per cent. of the ammonia employed enters into the reaction from which sulfocyanic acid results, the remainder being required to combine with the sulfocyanic acid and also with the sulfuretted hydrogen which is simultaneously produced.

According to our invention we economize the ammonia and obtain other advantages by introducing another base or bases into the reaction. We so regulate the proportions that practically the whole of the ammonia is utilized in the production of sulfocyanic acid, while the added base or bases combine with the whole of the sulfocyanic acid and of the sulfureted hydrogen. We prefer to conduct the operation in the following manner:

The first stage of our process consists in heating gently to about the temperature of boiling water, or somewhat higher, in closed vessels, carbon bisulfid and ammonia with the hydrated peroxid of manganese, known as "Weldon mud," washed free from calcic chlorid. Hereby there is formed (the quantities of material being in proper proportions) sulfocyanid and sulfid of manganese together with free sulfur. The reaction may be represented thus—

$$NH_3 + CS_2 = HCNS + H_2S.$$

The object of adding manganese peroxid is to absorb the sulfureted hydrogen, forming manganese sulfid and free sulfur, thus—

$$MnO_2 + 2H_2S = MnS + S + 2H_2O,$$

and to present a base to unite with the acid HCNS, which is effected either through the MnS or the MnO present in the prepared peroxid. Any small quantity of lime present in the mud also unites with the acid HCNS to form calcium sulfocyanid. Instead of employing Weldon mud, prepared as described, the peroxid obtained by igniting the carbonate of manganese may be employed, or the natural ore known as "wad."

Instead of employing the peroxid of manganese artificially prepared (or the native substance) alone, we employ these materials in quantity to combine with the $SH_2$ and add a second base to combine with the acid HCNS. This second base may be one of the alkalies or alkaline earths. We prefer to use caustic or slaked lime. During the reaction there is formed manganese sulfid, together with calcium sulfocyanid, thus—

(a) $2NH_3 + 2CS_2 = 2HCNS + 2H_2S.$
(b) $MnO_2 + 2H_2S = MnS + S + 2H_2O.$
(c) $CaO + 2CNHS = Ca(CNS)_2 + H_2O.$

The requisite amount or charge of base or bases is introduced into cylinders or other suitable digesters capable of withstanding the high pressure generated through the reaction and heated externally or internally by steam, and the requisite amount of ammonia and carbon bisulfid are all run in at once, or these two materials are pumped into the digesters in small quantities at a time to keep the reaction continually going on and prevent the pressure rising too high and too suddenly, as may be the case if the whole of the ammonia and bisulfid is added at once.

A very suitable apparatus is an autoclave provided with a mechanical stirrer and a jacket, to which either steam or cold water can be admitted at pleasure. The whole charge is placed in the autoclave, which is then closed, and the contents are heated with constant stirring. When the pressure rises to fifteen to twenty-five pounds per square inch, the steam is shut off. The pressure, however, continues to rise generally to sixty to ninety pounds to the inch and then falls again, when it may be again heated to complete the reaction; but reheating is not always necessary. If the pressure rises too high, it is checked by admitting water to the jacket.

With Weldon mud alone we find the following quantities the most suitable: seventy-six parts carbon bisulfid, 17.5 to eighteen parts ammonia, ($H_3N$,) fifty to fifty-six $MnO_2$ in the form of Weldon mud; but we considered it better to reduce the quantity of Weldon mud and make up the base with lime. The following quantities work well: Seventy-six parts carbon bisulfid, 17.5 to eighteen parts ammonia, ($H_3N$,) forty-seven parts $MnO_2$ in the form of Weldon mud, twenty parts slaked lime, containing seventy-six to eighty per cent. $CaH_2O_2$. The ammonia used is in the form of fifteen to twenty per cent. aqueous solution.

When the reaction is completed, the resulting mass is washed. The insoluble residue of manganese sulfid and free sulfur is exposed to the air to revivify and employed a second time.

The sulfocyanid of manganese or lime in solution may be crystallized and employed in commerce; or we precipitate the bases (lime or manganese) with the alkaline salts (carbonates, sulfates, or sulfids) and send such alkaline sulfocyanids into commerce.

The employment of peroxid of manganese is not essential to our invention; we may in lieu thereof employ lime or other base consisting of the alkalies or alkaline earths, either singly or together, in such proportion as to combine with both the sulfocyanic acid and the sulfureted hydrogen. Afterward by treatment of the product with carbonic-acid gas, the sulfureted hydrogen may be evolved in a gaseous state, and from this gas the sulfur may be recovered by known methods; or in place of peroxid of manganese we may employ magnesia or partly magnesia and partly lime. In this case, after the Gèlis reaction is complete, the sulfureted hydrogen may be evolved from the product by simply boiling under atmospheric pressure and, preferably, by free steam. The sulfureted hydrogen gas so obtained may be utilized and the sulfur recovered therefrom.

What we claim is—

1. The herein-described process which consists in heating together in a closed vessel, carbon bisulfid, ammonia and a fixed base or bases, in such proportions that the products of the reaction of the carbon bisulfid and ammonia combine with the fixed base or bases forming sulfocyanid and sulfid of the said base or bases.

2. The herein-described process, which consists in heating together in a closed vessel, carbon bisulfid, ammonia, peroxid of manganese and lime in about the following proportions: seventy-six parts carbon bisulfid, 17.5 to eighteen parts ammonia ($H_3N$), forty-seven parts $MnO_2$ in the form of Weldon mud, twenty parts slaked lime containing seventy-six to eighty per cent. of $CaH_2O_2$, causing the products of the reaction of the carbon bisulfid and ammonia to combine with the peroxid of manganese and lime and thereby form sulfocyanid and sulfid of the base.

JOHN JAMES HOOD.
ALFRED GORDON SALAMON.

Witnesses:
AF. WM. BRIGGS,
ERNEST GOLDIE.